United States Patent
Zhang et al.

(10) Patent No.: US 11,841,791 B2
(45) Date of Patent: Dec. 12, 2023

(54) CODE CHANGE REQUEST AGGREGATION FOR A CONTINUOUS INTEGRATION PIPELINE

(71) Applicant: International Business Machines Corporation, Armonk, NY (US)

(72) Inventors: Wen Tao Zhang, Beijing (CN); Hong Jun Tu, Beijing (CN); Yiwen Huang, Markham (CA); Yang Yang, Beijing (CN); Ye Cui, Beijing (CN); Xiao Kai Dong, Beijing (CN); Yu Chi Zhang, Beijing (CN); Wei Wu, Beijing (CN); Xin Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 17/340,741

(22) Filed: Jun. 7, 2021

(65) Prior Publication Data
US 2022/0391311 A1 Dec. 8, 2022

(51) Int. Cl.
G06F 11/36 (2006.01)
G06F 8/70 (2018.01)

(52) U.S. Cl.
CPC ............ *G06F 11/3688* (2013.01); *G06F 8/70* (2013.01); *G06F 11/3684* (2013.01)

(58) Field of Classification Search
CPC ..... G06F 11/3688; G06F 11/3684; G06F 8/70
See application file for complete search history.

(56) References Cited

U.S. PATENT DOCUMENTS 9,582,403 B2* 2/2017 Bakowski ........... G06F 11/3676
9,652,509 B2 5/2017 Shani et al.
(Continued)

FOREIGN PATENT DOCUMENTS

CN 101866317 B 7/2012
CN 110554954 A 12/2020

OTHER PUBLICATIONS

Meedeniya, D. A., I. D. Rubasinghe, and I. Perera. "Software artefacts consistency management towards continuous integration: a roadmap." International Journal of Advanced Computer Science and Applications 10.4 (2019). (Year: 2019).*

(Continued)

*Primary Examiner* — Kevin L Young
*Assistant Examiner* — Joanne G Macasiano
(74) *Attorney, Agent, or Firm* — Rachel M. Yadlosky

(57) ABSTRACT

A method, system, and computer program product to aggregate code change requests for a continuous integration pipeline. The method may include receiving a plurality of code change requests (CCRs) for a software product that are to be processed by a continuous integration (CI) pipeline. The method may also include obtaining all functions of the software product tested by all testcases in a testcase set. The method may also include selecting a plurality of groups of testcases from the testcase set, each group of the plurality of groups of testcases corresponding to a CCR from the plurality of CCRs. The method may also include identifying at least two groups of testcases from the plurality of groups of testcases without overlapping code. The method may also include aggregating each CCR that corresponds to the at least two groups of testcases into a single CCR group.

20 Claims, 11 Drawing Sheets

(56) References Cited

U.S. PATENT DOCUMENTS

| | | | |
|---|---|---|---|
| 2003/0093716 A1* | 5/2003 | Farchi | G06F 11/3676 |
| | | | 714/34 |
| 2018/0129497 A1* | 5/2018 | Biddle | G06F 11/3668 |
| 2018/0173608 A1* | 6/2018 | Paulraj | G06F 11/3664 |
| 2018/0300224 A1* | 10/2018 | Peng | G06F 11/3676 |
| 2018/0349789 A1* | 12/2018 | Chen | G06F 9/4881 |
| 2019/0129701 A1 | 5/2019 | Tawrylo et al. | |
| 2020/0065228 A1 | 2/2020 | Liu et al. | |
| 2020/0110693 A1 | 4/2020 | Herrin et al. | |
| 2021/0103514 A1* | 4/2021 | Das | G06F 11/3688 |

OTHER PUBLICATIONS

Labuschagne, Adriaan, Laura Inozemtseva, and Reid Holmes. "Measuring the cost of regression testing in practice: A study of Java projects using continuous integration." Proceedings of the 2017 11th joint meeting on foundations of software engineering. 2017. (Year: 2017).*

Mell et al., "The NIST Definition of Cloud Computing," Recommendations of the National Institute of Standards and Technology, U.S. Department of Commerce, Special Publication 800-145, Sep. 2011, 7 pages.

* cited by examiner

CODE CHANGE REQUEST AGGREGATION FOR A CONTINUOUS INTEGRATION PIPELINE

BACKGROUND

The present disclosure relates to computing technologies and, more specifically, to aggregating code change requests for a continuous integration pipeline.

Continuous integration (CI) is a development practice where developers frequently integrate code into a shared repository. Each integration can then be verified by automated building and automated tests so that errors can be detected quickly and located more easily. In recent years, CI has become a preferred practice for software development, as it can keep a developed application deployable at any point and, in some instances, can even push a main codebase automatically into production whenever new changes are brought in.

SUMMARY

The present invention provides a computer-implemented method, system, and computer program product to aggregate code change requests for a continuous integration pipeline. The method may include receiving, by one or more processing units, a plurality of code change requests (CCRs) for a software product that are to be processed by a continuous integration (CI) pipeline. The method may also include obtaining, by one or more processing units, all functions of the software product tested by all testcases in a testcase set. The method may also include selecting, by one or more processing units, a plurality of groups of testcases from the testcase set, each group of the plurality of groups of testcases corresponding to a CCR from the plurality of CCRs. The method may also include identifying, by one or more processing units, at least two groups of testcases from the plurality of groups of testcases without overlapping code, where each group of testcases, from the at least two groups of testcases, has all different functions than the other groups of testcases from the at least two groups of testcases. The method may also include, in response to identifying the at least two groups of testcases, aggregating, by one or more processing units, each CCR that corresponds to the at least two groups of testcases into a single CCR group. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
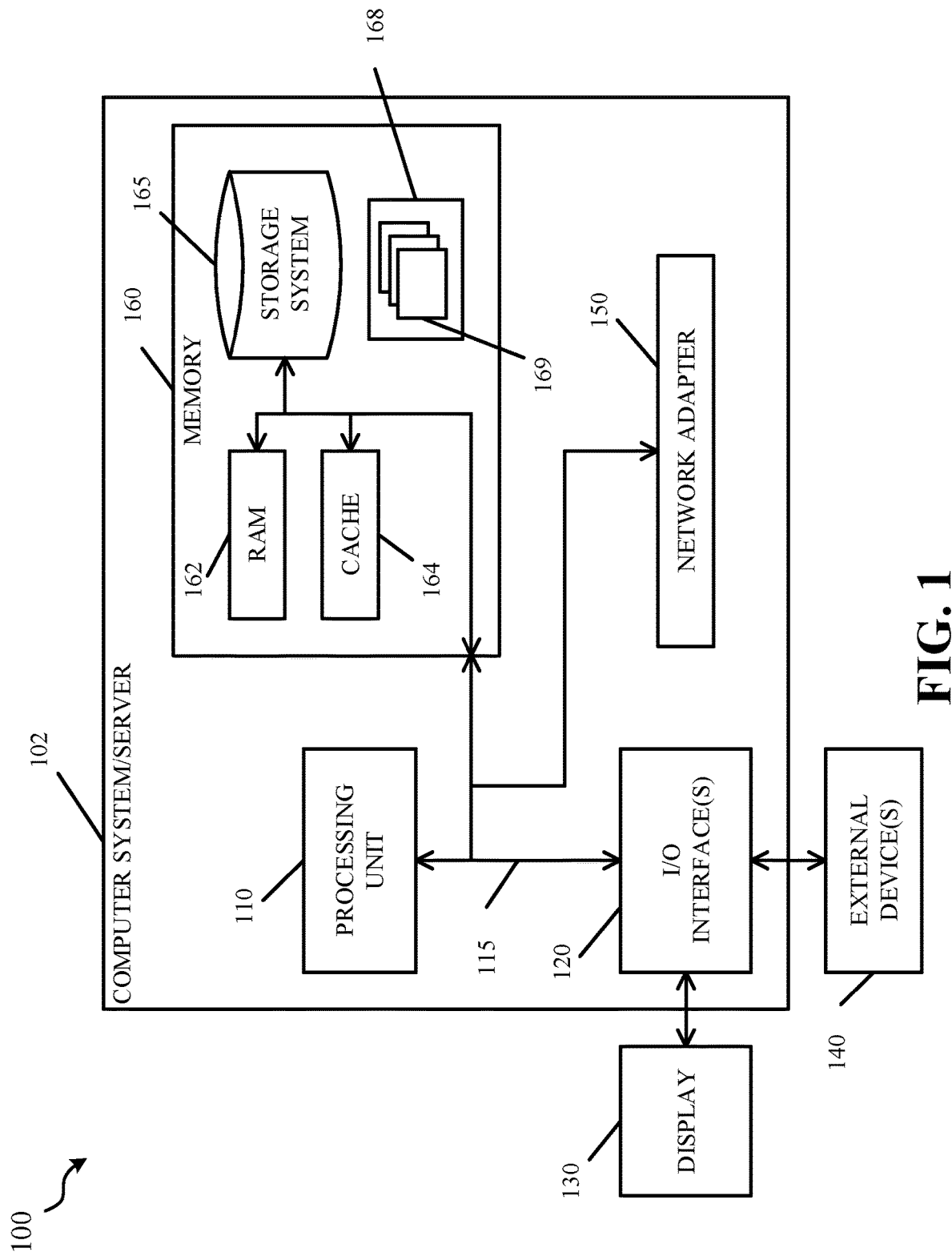
FIG. 1 depicts a block diagram of an example computer system environment, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Referring to FIG. 1, computer system 100 is a computer system/server 102 is shown in the form of a general-purpose computing device, according to some embodiments. In some embodiments, computer system/server 102 is located on the linking device. In some embodiments, computer system 102 is connected to the linking device. The components of computer system/server 102 may include, but are not limited to, one or more processors or processing units 110, a system memory 160, and a bus 115 that couples various system components including system memory 160 to processor 110.

Bus 115 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically includes a variety of computer system readable media. Such media may be any available media that is accessible by computer system/server 102, and it includes both volatile and non-volatile media, removable and non-removable media.

System memory 160 can include computer system readable media in the form of volatile memory, such as random-access memory (RAM) 162 and/or cache memory 164. Computer system/server 102 may further include other removable/non-removable, volatile/non-volatile computer system storage media. By way of example only, storage system 165 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 115 by one or more data media interfaces. As will be further depicted and described below, memory 160 may include at least one program product having a set (e.g., at least one) of program modules that are configured to carry out the functions of embodiments of the disclosure.

Program/utility 168, having a set (at least one) of program modules 169, may be stored in memory 160 by way of example, and not limitation, as well as an operating system, one or more application programs, other program modules, and program data. Each of the operating system, one or more application programs, other program modules, and program data or some combination thereof, may include an implementation of a networking environment. Program modules 169 generally carry out the functions and/or methodologies of embodiments of the invention as described herein.

Computer system/server 102 may also communicate with one or more external devices 140 such as a keyboard, a pointing device, a display 130, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 120. Still yet, computer system/server 102 can communicate with one or more networks such as a local area network (LAN), a general wide area network (WAN), and/or a public network (e.g., the Internet) via network adapter 150. As depicted, network adapter 150 communicates with the other components of computer system/server 102 via bus 115. It should be understood that although not shown, other hardware and/or software components could be used in conjunction with computer system/server 102. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
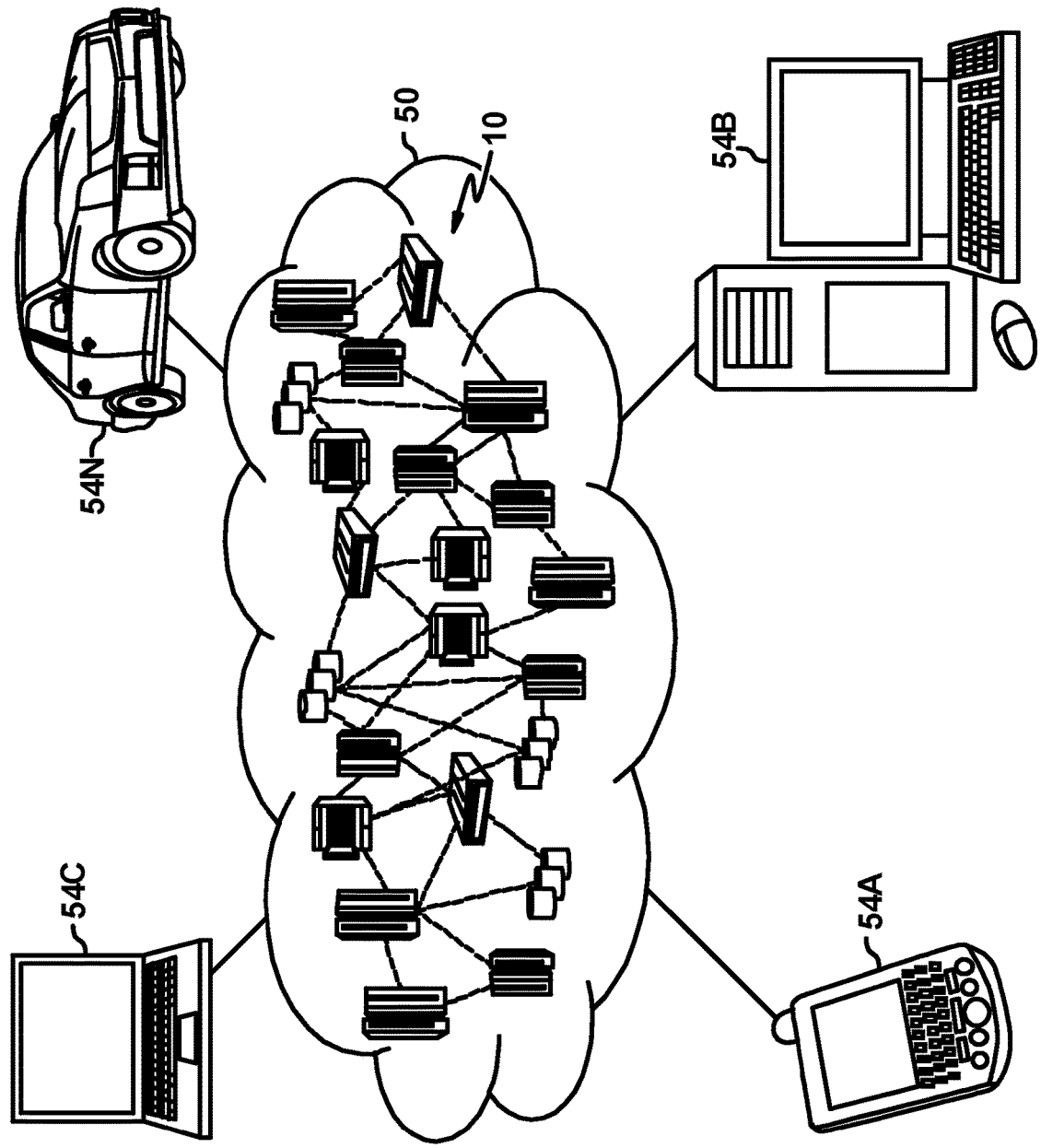
FIG. 2 depicts a cloud computing environment, according to some embodiments.

Referring now to FIG. 2, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
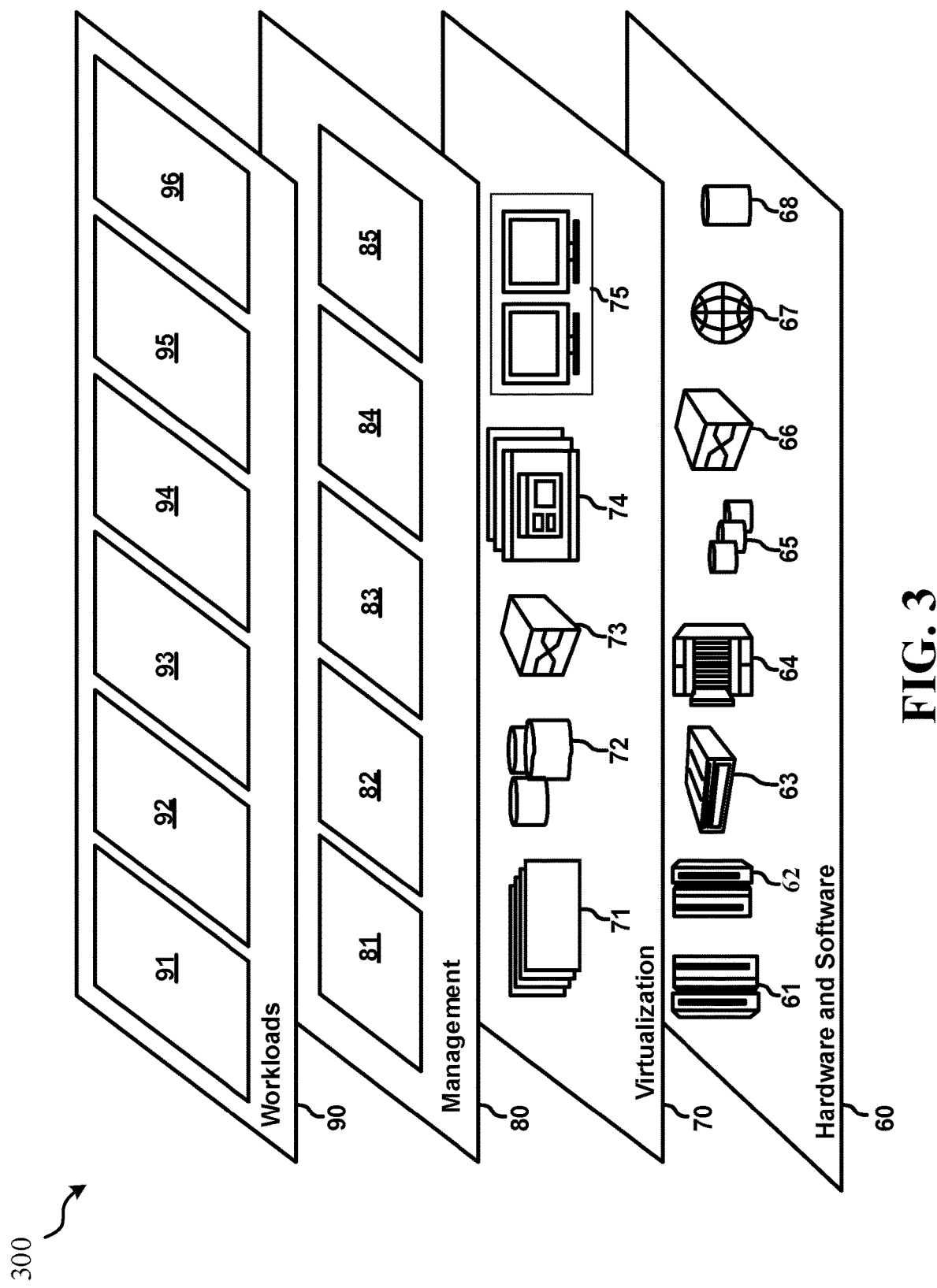
FIG. 3 depicts abstraction model layers, according to some embodiments.

Referring now to FIG. 3, a set of functional abstraction layers 300 provided by cloud computing environment 50 (FIG. 2) is shown, according to some embodiments. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code change request aggregation 96.

Continuous integration (CI) pipelines, or other CI implementations, may be a central process used in commercial product developments. CI pipelines may be operations or steps that need to be performed to update software. In some instances, the operations within a CI pipeline may need to be performed in order (i.e., sequentially), to achieve the software update. Since a CI pipeline is a central process, it may be important to optimize its execution speed.

In conventional CI pipelines, a developer may create a code change request (CCR) (such as a review request, a merge request, a pull request, etc.) for a software product. The CCR may include information for the original code and the changed code, such as their locations in a code base repository, and a request for verifying the changed code by the CI pipeline. The original code may represent a piece of program code in the software product before the CCR is submitted, and the changed code may represent the changed piece of program code in the software product submitted by the CCR. In some instances, the CCR and the changed code may relate to bugs or features of the software product that are having issues, and the changed code from the CCR may help fix the issue. The CCR my commit the changed code to the CI pipeline for verifying the changed code. After receiving the CCR, the CI pipeline may check the changed code to find which parts of the original code are changed, then may replace the original code with the changed code in the software product to obtain a changed product, and then may build the changed product to obtain a built product, such as an image. After that, the CI pipeline may deploy the built product and may test the deployed product using a testcase set comprising a plurality of testcases. If the test is successful, the changed code can be accepted. If one testcase fails, the test is failed, the changed code cannot be accepted.

In conventional CI pipelines, the test may be implemented using all testcases in the testcase set. The larger the total number of testcases in the testcase set, the more time the test will take. On the other hand, when many CCRs are waiting in line, the waiting CCRs need to be processed one by one by the CI pipeline, and the CI pipeline may need a lot of time and resources to process the waiting CCRs. This may lead to long waiting times (e.g., a long time waiting in line) for the CI pipeline when there are large amounts of test cases to be executed. Further, when many pull requests (PRs) are waiting in line, a new PR may have to merge with an earlier PR. This may lead to the CI pipeline being repeatedly triggered, which may waste time, human efforts, power resources, etc.

In addition, as CI pipelines may be central and frequently used processes, it is important to optimize their execution speed. Any small delay in the CI workflow and CI pipeline may compound exponentially as the rate of feature releases (e.g., releases of new features), team size, and codebase size grow.

Therefore, there is a need to develop a method, a system and a program product for aggregating code change requests (CCRs) into a CCR group for a continuous integration (CI) pipeline, such that the CCRs in the CCR group can be processed together by the CI pipeline to save time and resources and reduce and/or prevent delays to the CI pipeline execution speed.

According to some embodiments of present disclosure, in order to aggregate CCRs into the CCR group for the CI pipeline, if the test is implemented for a first CCR using a first group of testcases and for a second CCR using a second group of testcases; and if the first group of testcases corresponding to the first CCR have no relationship with the second group of testcases corresponding to the second CCR, it can be concluded that the changed code requested by the first CCR have no overlap with the changed code requested by the second CCR, and then the first CCR and the second CCR can be aggregated into one group to be processed together by the CI pipeline. Put differently, if the testcase groups that correspond to two different CCRs have no relation to each other, then the changed code from each CCR (e.g., a first changed code from the first CCR and a second changed code from a second CCR) does not overlap and the two CCRs can be grouped and processed together. If the changed code from each CCR would have overlapped, then the CCRs may not be able to be processed together as the changes made from one CCR would likely affect the other CCR.

To determine whether the first group of testcases corresponding to the first CCR have no relationship with the second group of testcases corresponding to the second CCR, all functions tested by all testcases in the first group of testcases and all functions tested by all testcases in the second group of testcases can be considered (for instance, all functions that relate to the testcases that correspond to the two CCRs may be considered). If all functions tested by all testcases in the first group of testcases are different from all functions tested by all testcases in the second group of testcases, it can be concluded that the first group of testcases corresponding to the first CCR has no relationship with the second group of testcases corresponding to the second CCR, and the first CCR and the second CCR can be aggregated into one group. If one function tested by any testcases in the first group of testcases is the same as one function tested by any testcase in the second group of testcases, it can be concluded that the first group of testcases corresponding to the first CCR has relationship with the second group of testcases corresponding to the second CCR, and the first CCR and the second CCR cannot be aggregated into one group.

In some instances, suppose that a changed code related to memory usage of the software product is requested in a first CCR, a changed code related to network usage of the software product is requested in a second CCR, and a changed code related to both memory usage and network usage of the software product is requested in a third CCR. A code related to the memory usage and a code related to the network usage may be independent of each other in the software product, thus an identified first group of testcases corresponding to the first CCR may have no relationship with an identified second group of testcases corresponding to the second CCR, so the first CCR and the second CCR can be aggregated into one group to be processed together by a CI pipeline. Even a test for the CCR group done in the CI pipeline fails, it may be easy to identify which CCR has failed from failed testcase(s). Thus, when the first CCR and the second CCR are processed together by a CI pipeline (such as CI pipeline 406 (FIG. 4)), time and resources for the CI process can be saved. However, in instances where a first group of testcases corresponding to the first CCR has relationship with a third group of testcases corresponding to the third CCR, if the first CCR and the third CCR are aggregated into one group to be processed together by the CI pipeline, and if a test for the CCR group done in the CI pipeline fails, it may not be determined which CCR is failed from failed testcase(s) (for example, the system cannot determine which changed code cannot be accepted in the software product). Thus, the first CCR and the third CCR cannot be aggregated into one CCR group to be processed together by the CI pipeline. Aggregating CCRs into a single group, or at least fewer groups, may save the system time and resources, and decrease or even eliminate backups of CCRs waiting to be processed, while also preventing the change code for the entire group from being rejected if a test fails (as the system may be able to isolate which testcase from the group is causing the failure, as the different testcases from the different CCRs that are grouped together are not related).

Figure 4:
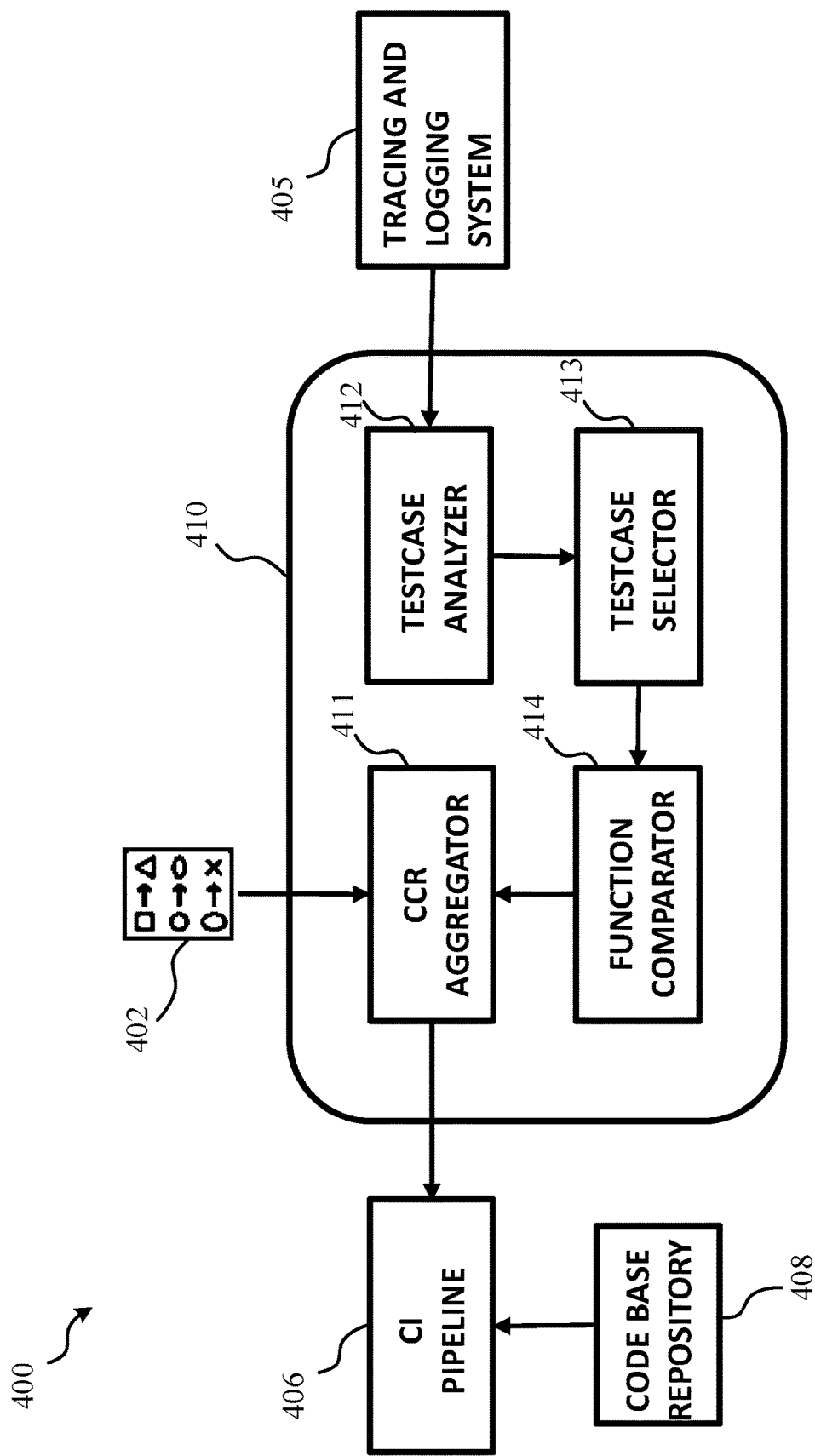
FIG. 4 depicts a schematic diagram of an exemplary code change request (CCR) aggregation system for aggregating CCRs for a continuous integration (CI) pipeline, according to some embodiments.

Based on the above description, a schematic diagram of a proposed exemplary CCR aggregation system environment 400 is depicted in FIG. 4, according to some embodiments. The CCR aggregation system environment 400 includes a CCR aggregation system 410 for aggregating CCRs 402 for a CI pipeline 406. Referring to FIG. 4, the CCR aggregation system 410 may include a CCR aggregator 411, a testcase analyzer 412, a testcase selector 413, and a function comparator 414. The CCR aggregator 411 may initially be configured to receive a plurality of code change requests (CCRs) 402 for a software product to be processed by a continuous integration (CI) pipeline 406. The testcase analyzer 412 may be configured to obtain functions of the software product tested by each testcase in a testcase set. The testcase set may include a plurality of testcases for testing the software product. The testcase selector 413 may be configured to select a plurality of groups of testcases from the testcase set and each group corresponds to one of the plurality of CCRs 402 respectively. In some embodiments, the testcase selector 413 may select the plurality of groups of testcases based on the plurality of CCRs 402 and the functions of the software product tested by each testcase in the testcase set. The function comparator 414 may be configured to identify at least two groups of testcases from the plurality of groups of testcases, where functions associated with any one group of testcases in the at least two groups are different from functions associated with any other group in the at least two groups. In some embodiments, the identifying the at least two groups of testcases can be done by comparing functions associated with the plurality of groups of testcases. Here, functions associated with a group of testcases means all functions of the software product tested by all testcase of the group of testcases. The CCR aggregator 411 may be configured to aggregate at least two CCRs, from the plurality of CCRs 402, respectively corresponding to the at least two groups of testcases into a CCR group. In some instances, the at least two CCRs in the CCR group may be processed in one workflow in a continuous integration (CI) pipeline 406. One of the at least two CCRs may correspond to one of the at least two groups of testcases and another of the at least two CCRs may correspond to another of the at least two groups of testcases. A CCR of the plurality of CCRs 402 may include information original code and changed code, such as locations of both pieces of code in the code base repository 408, and a request for verifying the changed code by the CI pipeline 406.

In some embodiments, the testcase analyzer 412 may obtain functions of the software product tested by each testcase in the testcase set via a tracing and logging system 405. Specifically, the tracing and logging system 405 may save data for tracing for functions by each testcase and logging by each testcase when each testcase in the testcase set is used to test the software product. The data is named as function footprint for each testcase. The testcase analyzer 412 may obtain the function footprint from the tracing and logging system 405 and then analyze the function footprint to find which functions in the software product are tested by respective testcases so that functions tested by each testcase in the testcase set can be obtained.

In some embodiments, the testcase analyzer 412 may obtain functions of the software product tested by each testcase in the testcase set with helps from existing tools, which may be able to trace API calls when a testcase is executing. The functions tested by each testcase may be obtained based on the API calls.

Figure 5:
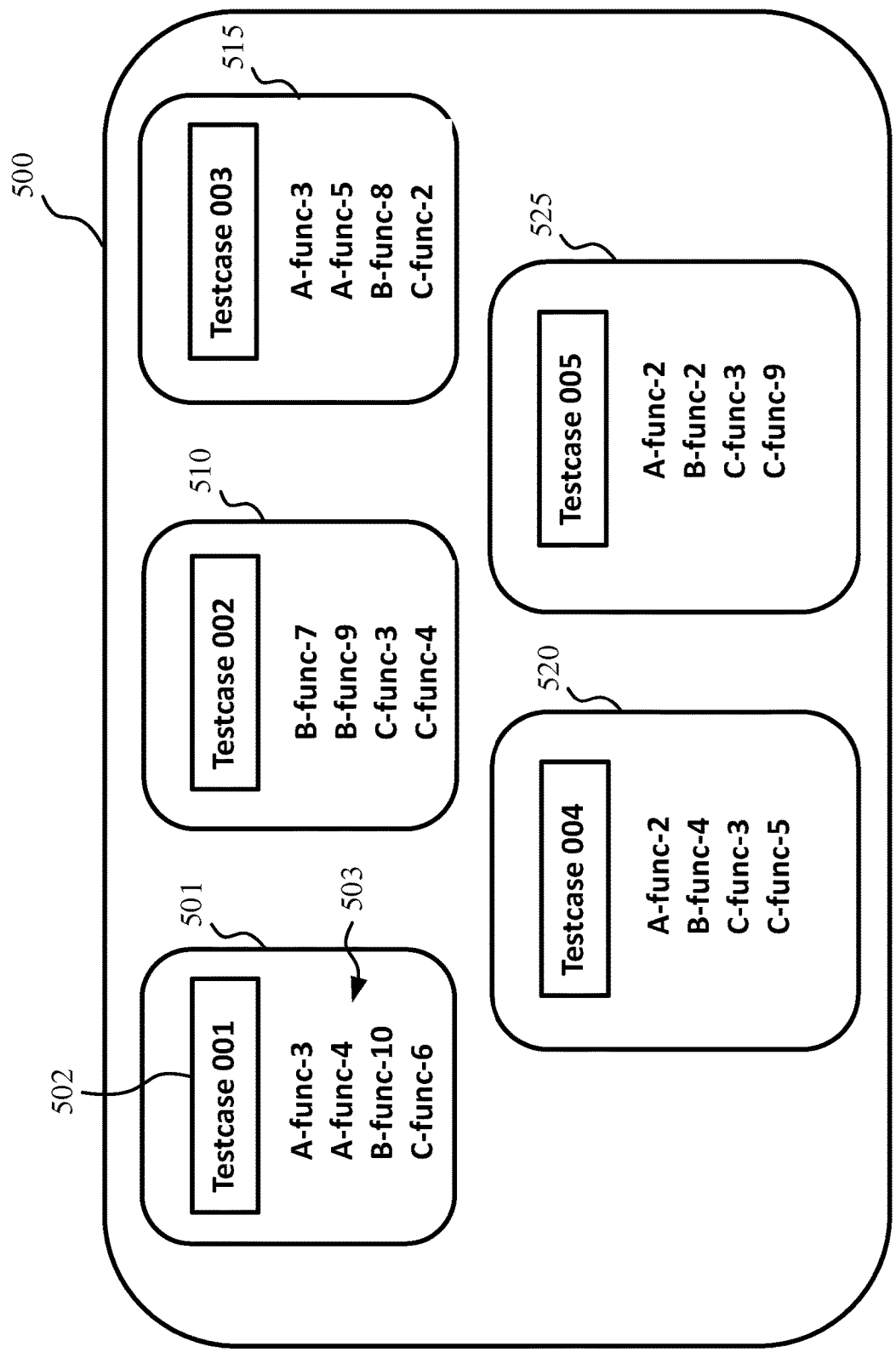
FIG. 5 depicts a schematic diagram of an exemplary testcase set and the functions tested by each testcase in the testcase set, according to some embodiments.

FIG. 5 depicts a schematic diagram of an exemplary testcase set 500 and the functions tested by each testcase in the testcase set 500, according to some embodiments. The testcase set 500 includes five testcases, testcase 001 501, testcase 002 510, testcase 003 515, testcase 004 520, and testcase 005 525. In some embodiments, a name or an ID of a testcase 501 is indicated by a block 502. Each testcase may also have functions that are tested by the testcase. For example, testcase 001 501 tests functions 503, which include A-func-3, A-func-4, B-func-10, and C-func-6. It can be understood that any data structures can be used to represent the information of functions tested by each testcases in the testcase set 500, such as an XML file, a text file, and the like. In some embodiments, the testcase set 500 may include only the testcases (501, 510, 515, 520, and 525) that relate to the CCR or CCRs.

In some embodiments, in conventional CI pipelines, there may be a large amount of ungrouped testcases. Therefore, in conventional CI pipelines, even though a test may be automatically executed, it may still need a lot of time to finish the testing for all testcases in the testcase set. However, the built software product with the changed code related to a CCR is usually for small number of bugs or small number of functions, so there is no need to test the built software product with the changed code using all testcases in the testcase set. Therefore, a limited group of testcases that correspond to the CCR may be selected from a large group of testcases, the limited group of testcases may be tested, and the time of the CI process for the CCR may be reduced as every single testcase may not be tested.

In some embodiments, the testcase selector 413 (FIG. 4) may select a specific group of testcases corresponding to specific changed code related to a specific CCR using existing technologies to save time and resource for further CI processes. In some instances, each of a plurality of tests can be ranked based on each test attribute and each test context so that the testcase selector 413 (FIG. 4) may select testcase based on each test rank.

In some embodiments, the testcase selector 413 (FIG. 4) may select a particular group of testcases corresponding to a particular CCR to save time and resource for further CI processes. Specifically, for a particular CCR in the plurality of CCRs, the testcase selector 413 (FIG. 4) may first obtain particular original code and particular changed code related to the particular CCR, based on information included in the particular CCR (for example, from the repository 408 (FIG. 4) based on locations of the particular original code and the particular changed code). Then the testcase selector 413 (FIG. 4) may identify at least one code change pattern in the particular changed code compared with the particular original code, and then may generate or obtain from other source (such as from the repository 408 (FIG. 4)) the particular call graph for the particular changed code. In the specific call graph, a node may represent a function in the particular changed code, an edge may represent a call relationship between two functions in the particular changed code, and a code path may consist of directly connected edges through nodes and connected nodes. The particular call graph can be generated by analyzing the changed code, by using existing tools, etc. After obtaining the particular call graph, the testcase selector 413 (FIG. 4) may select a particular group of testcases corresponding to the particular CCR based on the at least one code change pattern, the identify call graph and the functions tested by each testcase in the testcase set.

A code change pattern may indicate how the original code is changed into the changed code. A change code pattern may include three patterns (for example, a function updated pattern, function added pattern, and function deleted pattern). The function updated pattern may be related to at least one updated function, the function added pattern may be related to at least one added function, and the function deleted pattern may be related at least one deleted function.

In some embodiments, for each specific code change pattern in the at least one code change pattern, if the testcase selector 413 (FIG. 4) determines that the specific change code pattern is related to an updated function, then for each specific testcase in the testcase set, if the specific testcase tests a function included in either code paths affecting the updated function or code paths affecting a parent function of the updated function in the particular call graph, the testcase selector 413 may add the specific testcase to the particular group of testcases corresponding to the particular CCR.

Figure 6:
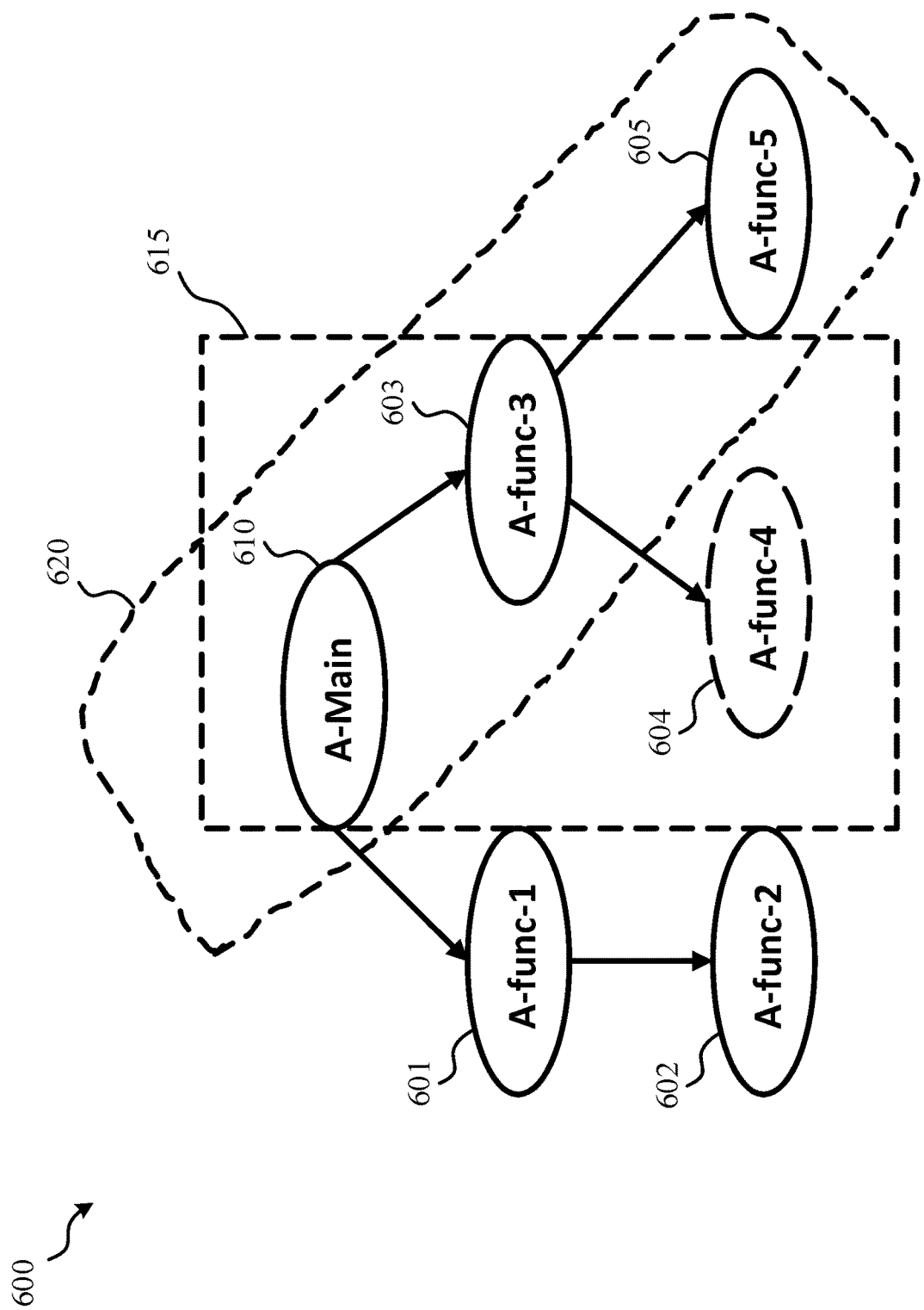
FIG. 6 depicts a schematic diagram of a portion of an exemplary call graph of a changed code related to a first CCR, according to some embodiments.

In an example, FIG. 6 depicts a schematic diagram of a portion of an exemplary call graph 600 of changed code related to a CCR, according to some embodiments. The portion of the exemplary call graph 600 includes six functions—"A-Main" 610, "A-func-1" 601, "A-func-2" 602, "A-func-3" 603, "A-func-4" 604, and "A-func-5" 605. In some embodiments, one identified code change pattern in the changed code is related to an updated function of "A-func-4" 604. In the portion of the exemplary call graph 600, a code path 615 may affect the updated function of "A-func-4" 604. The code path 615 comprises functions "A-main" 610, "A-func-3" 603 and "A-func-4" 604. A parent function of the updated function "A-func-4" 604 is a function of "A-func-3" 603, and a code path 620 may affect the function "A-func-3" 603. The code path 620 includes functions "A-main" 610, "A-func-3" 603 and "A-func-5" 605. The functions that are included in the code path 620 that affects the parent function ("A-func-3" 603) and the code path 615 that affects the updated function ("A-func-4" 604) include "A-func-4" 604, "A-func-3" 603, "A-func-5" 605, and "A-main" 610. Referring back to FIG. 5, the function of "A-func-3" is tested by the testcase 001 501 and the testcase 003 515, the function of "A-func-4" is tested by the testcase 001 501, and the function of "A-func-5" is tested by the testcase 003 515. Thus, the testcase selector 413 may select the particular group of testcases comprising the testcase 001 and the testcase 003 for the CCR.

In some embodiments, for each specific code change pattern in the at least one code change pattern, if the testcase selector 413 (FIG. 4) determines that the specific change code pattern is related to an added function, then for each specific testcase in the testcase set, if the specific testcase tests a function included in either code paths affecting the added function or code paths affecting a parent function of the added function in the particular call graph, the testcase selector 413 may add the specific testcase to the particular group of testcases corresponding to the particular CCR. Put differently, when a change code pattern is related to an added function, testcases (in the testcase set) that test functions that are included in code paths affecting either the added function or the parent function are determined to be related to the CCR and can be grouped with the other testcases related to the CCR.

Figure 7:
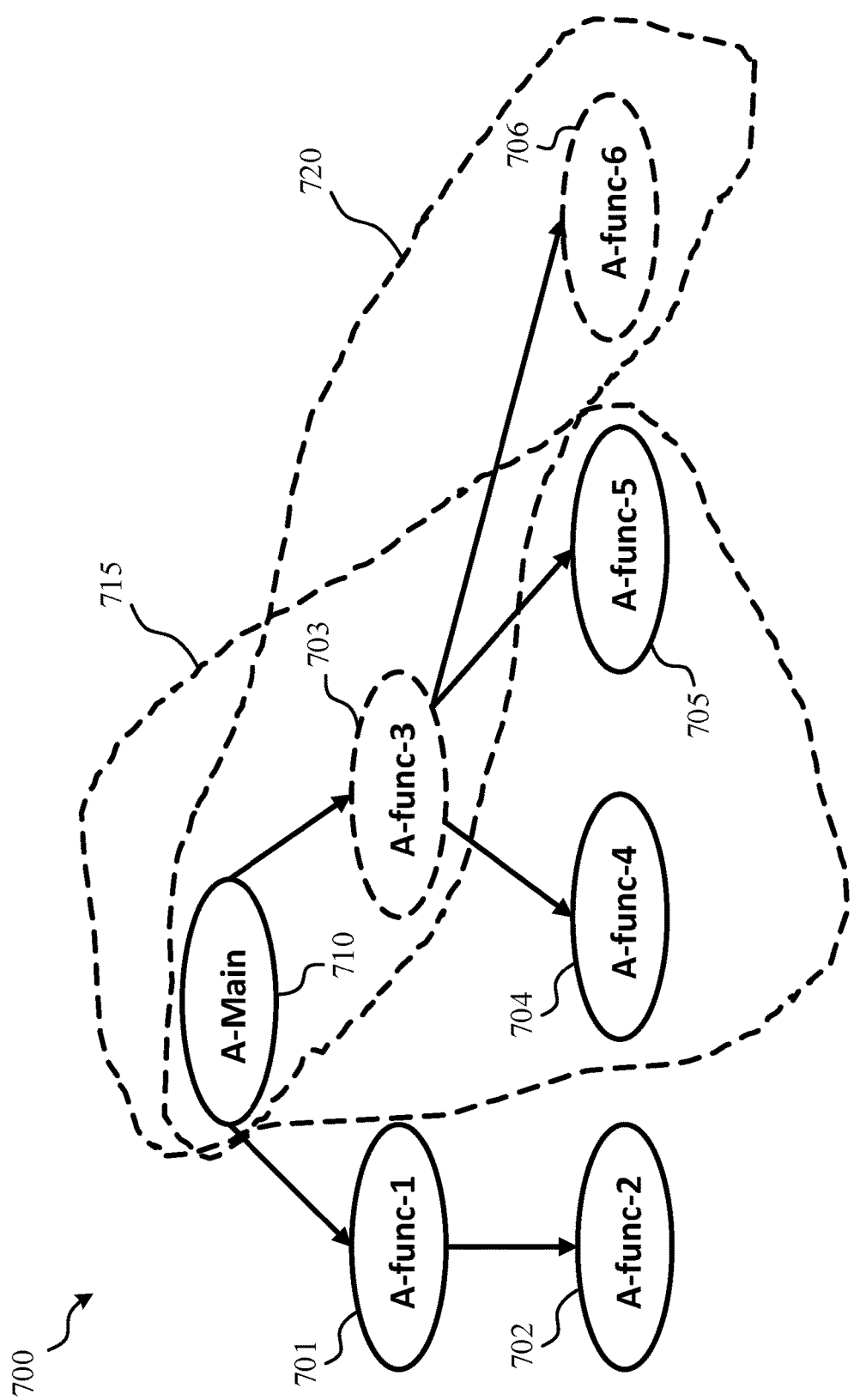
FIG. 7 depicts a schematic diagram of a portion of an exemplary call graph of a changed code related to a second CCR, according to some embodiments.

In an example, FIG. 7 depicts a schematic diagram of a portion of an exemplary call graph 700 of changed code related to a second CCR, according to some embodiments. The portion of the exemplary call graph 700 includes functions "A-main" 710, "A-func-1" 701, "A-func-2" 702, "A-func-3" 703, "A-func-4" 704, "A-func-5" 705, and "A-func-6" 706. One identified code change pattern in the changed code is related to an added function of "A-func-6" 706. The portion of the exemplary call graph 700 includes a code path 720 that may affect the added function of "A-func-6" 706. Additionally, a parent function of the added function "A-func-6" 706 is the function "A-func-3" 703, and a code path 715 may affect "A-func-3" 703. Thus, functions included in code paths 715 and 720 may be checked to determine whether any of them are tested by any testcase (for example, in FIG. 5) so that the testcase selector (for example, testcase selector 413) may select a particular group of testcases corresponding to the second CCR. For instance, code paths 715 and 720 include functions "A-main" 710, "A-func-3" 703, "A-func-4" 704, "A-func-5" 705, and "A-func-6" 706. Referring now to FIG. 5, "A-func-3" is included in testcase 001 501 and testcase 003 515, "A-func-4" is included in testcase 001 501, "A-func-5" is included in testcase 003 515, and "A-func-6" is not included in any of the testcases. Therefore, testcase 001 and testcase 003 may be included in the group of testcases for the second CCR.

In some embodiment, for each specific code change pattern in the at least one code change pattern, if the testcase selector 413 (FIG. 4) determines that the specific change code pattern is related to a deleted function, then for each specific testcase in the testcase set, if the specific testcase tests a function included in code paths affecting a parent function of the deleted function in the particular call graph, the testcase selector 413 may add the specific testcase to the particular group of testcases corresponding to the particular CCR.

Figure 8:
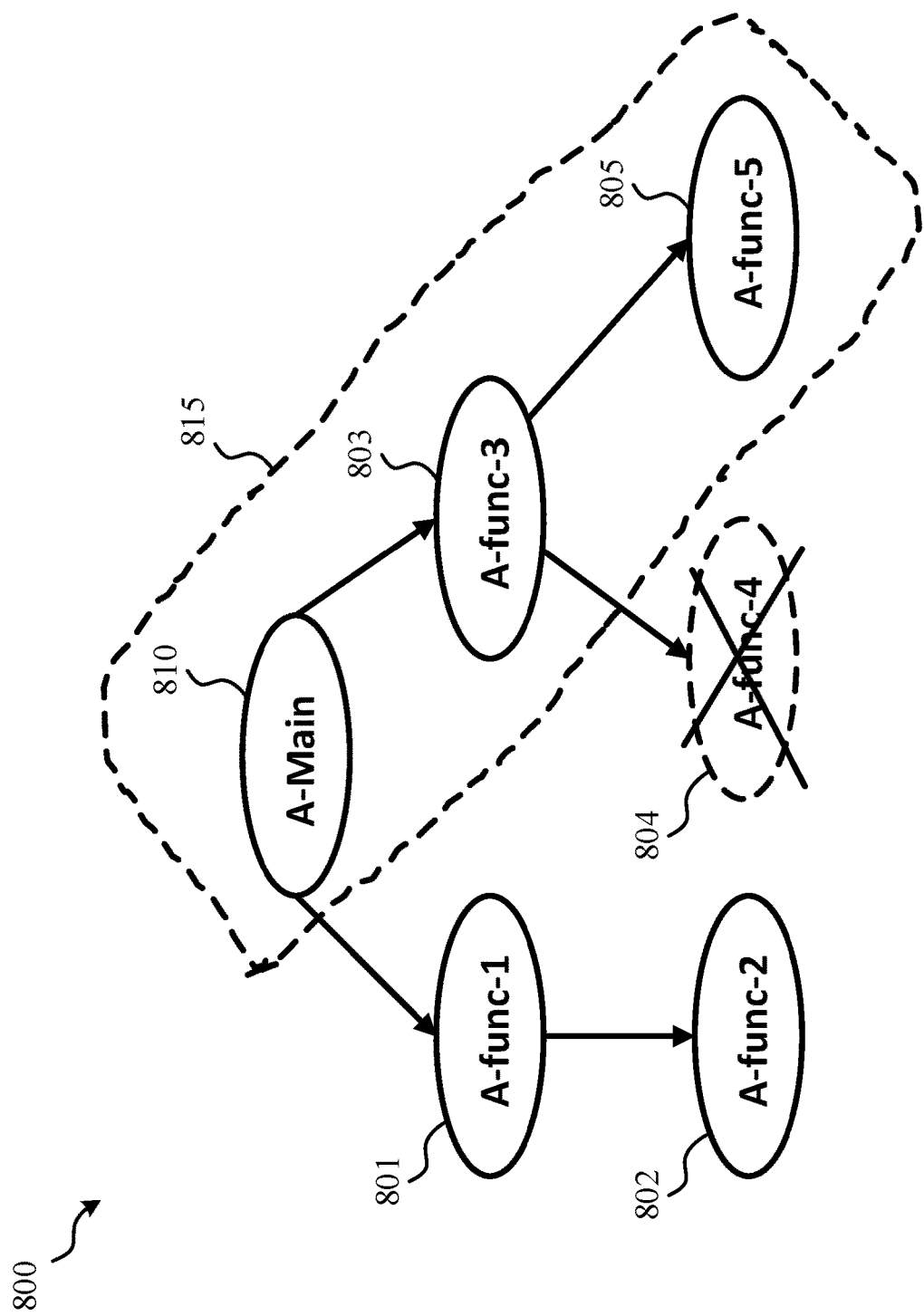
FIG. 8 depicts a schematic diagram of a portion of an exemplary call graph of a changed code related to a third CCR, according to some embodiments.

In an example, FIG. 8 depicts a schematic diagram of a portion of an exemplary call graph 800 of changed code related to a third CCR, according to some embodiments. The portion of the exemplary call graph 800 includes functions "A-main" 810, "A-func-1" 801, "A-func-2" 802, "A-func-3" 803, "A-func-4" 804, and "A-func-5" 805. However, function "A-func-4" 804 has been deleted. One identified code change pattern in the changed code is related to the deleted function "A-func-4" 804. The portion of the exemplary call graph 800 includes a parent function of "A-func-4" 804, "A-func-3" 803, and a code path 815 may affect the function of "A-func-3" 803. Thus, functions included in code path 815 may be checked to determine whether one of them is tested by any testcase in FIG. 5 so that the testcase selector 413 may select a particular group of testcases corresponding to the third CCR.

In some embodiments, after the at least two CCRs are aggregated into the CCR group by the CCR aggregation system 410 (FIG. 4), the CI pipeline 406 (FIG. 4) may first obtain each changed code related to each CCR in the CCR group (such as from the repository based on information of each changed code in each CCR), replace each original code with each changed code related to each CCR in the CCR group into the software product to obtain a merged software product, build the merged software product to obtain a built software product, and test the built software product using the at least two groups of testcases corresponding to the at least two CCRs in the CCR group. It can be understood that the CCR group comprising at least two CCRs may be process in one workflow of the CI pipeline 406, thus processing time, as well as resources, can be saved.

Figure 9:
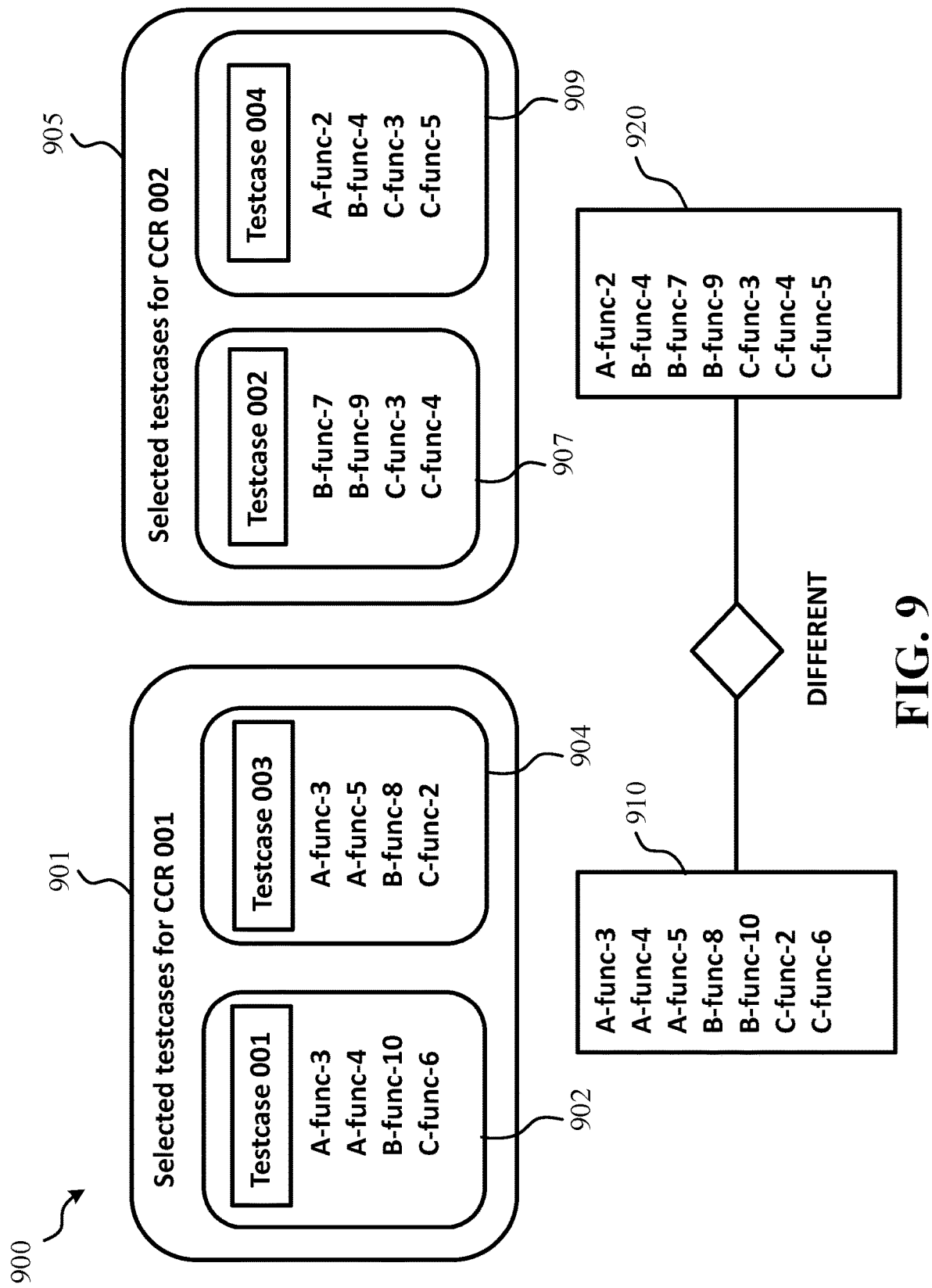
FIG. 9 depicts a schematic diagram of an exemplary result from the testcase selector, according to some embodiments.

In an example, a schematic diagram of an exemplary result 900 from the testcase selector 413, the function comparator 414, and the CCR aggregator 411 (FIG. 4) is depicted in FIG. 9, according to some embodiments. A block 901 indicates selected testcases corresponding to a CCR 001 and a block 905 indicates selected testcases corresponding to a CCR 002. Selected testcases for CCR 001 901 include testcase 001 902 with functions "A-func-3," "A-func-4," "B-func-10," and "C-func-6" as well as testcase 003 904 with functions "A-func-3," "A-func-5," "B-func-8," and "C-func-2." Selected testcases for CCR 002 905 include testcase 002 907 with functions "B-func-7," "B-func-9," "C-func-3," and "C-func-4" as well as testcase 004 with functions "A-func-2," "B-func-4," "C-func-3," and "C-func-5." In some instances, all selected testcases are selected by the testcase selector 413 (FIG. 4). A block 910 illustrates all the functions in a group of testcases related to the CCR 001 and a block 920 illustrates all the functions in a group of testcases related to the CCR 002. In some embodiments, all the functions in the two groups are used by the function comparator 414 (FIG. 4). The compared result indicates that functions in the block 910 and functions in the block 920 are different (i.e., no overlapped function). Because the functions related to CCR 001 910 and the functions related to CCR 002 920 are different, CCR aggregator 411 (FIG. 4) may aggregate the CCR 001 and the CCR 002 into one CCR group. However, if there was a function in the block 910 which is the same as a function in the block 920, the CCR aggregator 411 would not aggregate the CCR 001 and the CCR 002 into one CCR group. In some embodiments, if the at least two CCRs are aggregated into the CCR group, the built software product with the changed code may be tested using the at least two groups of testcases corresponding to the at least two CCRs, which may reduce the time and resources needed for the CI process.

Figure 10:
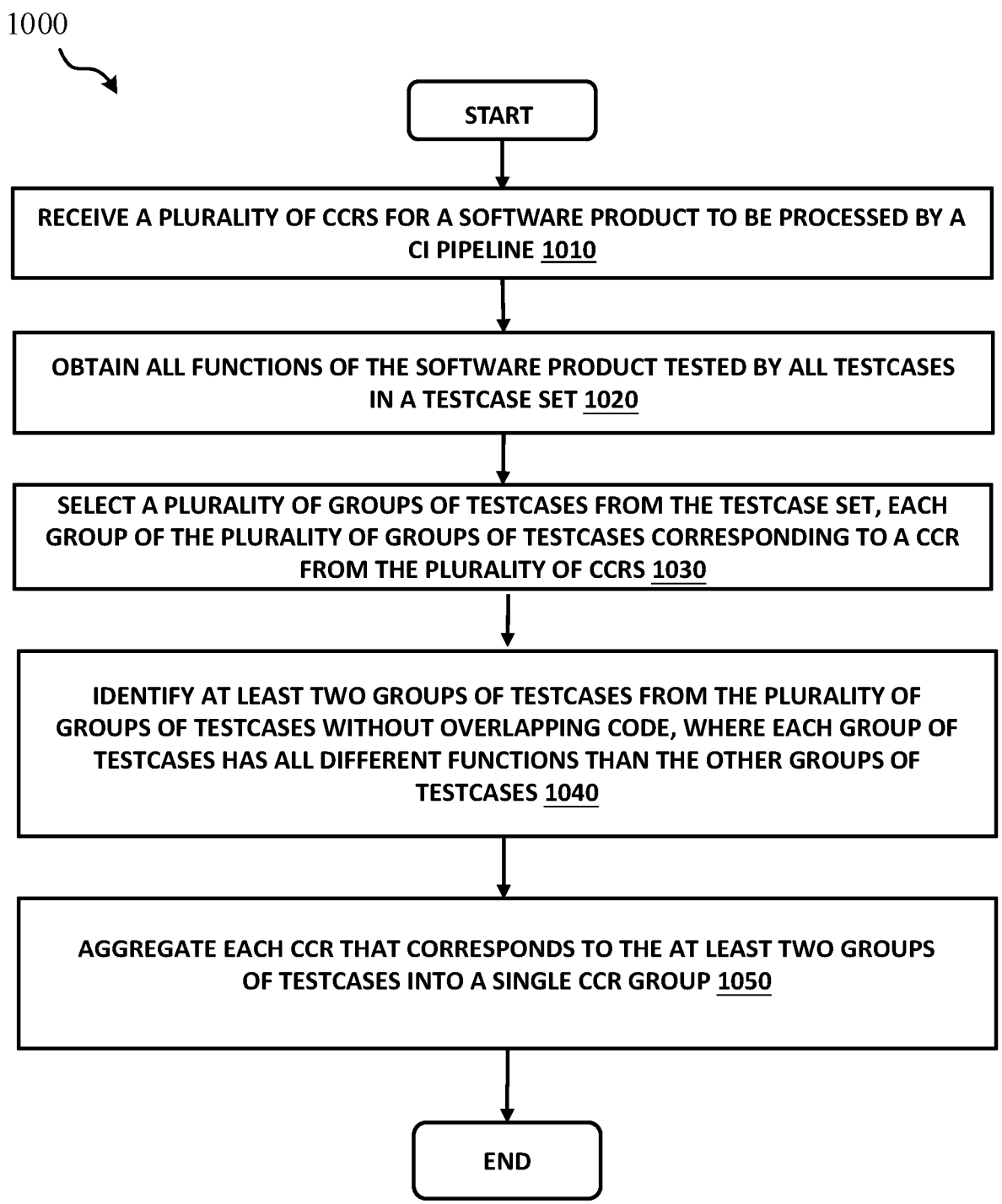
FIG. 10 depicts a flowchart of an exemplary method for aggregating CCRs for CI pipelines, according to some embodiments.

FIG. 10 depicts a flowchart of an exemplary method 1000 for aggregating CCRs for a CI pipeline, according to some embodiments. The method 1000 may be implemented by the CCR aggregation system 410 (FIG. 4), or other suitable computer/computing systems. For ease of understanding, the method 1000 will be described with reference to FIG. 4.

After the process 1000 starts, at 1010, the CCR aggregation system 410 may receive a plurality of code change requests (CCRs) for a software product to be processed by a continuous integration (CI) pipeline.

At 1020, the CCR aggregation system 410 may obtain all functions of the software product tested by all testcases in a testcase set. Here the testcase set includes testcases for testing the software product.

At 1030, the CCR aggregation system 410 may select a plurality of groups of testcases from the testcase set, each group of the plurality of groups of testcases corresponding to a CCR from the plurality of CCRs.

At 1040, the CCR aggregation system 410 may identify at least two groups of testcases from the plurality of groups of testcases that do not have overlapping code, where functions associated with any one group of testcases in the at least two groups are different from functions associated with any other group in the at least two groups, such as by comparing functions associated with the plurality of groups of testcases. Put differently, each group of testcases has all different functions than the other groups of testcases. Here, functions associated with a group of testcases means all functions of the software product tested by all testcase of the group of testcases.

At 1050, the CCR aggregation system 410 may aggregate each CCR that corresponds to the at least two groups of testcases into a single CCR group. In some instances, the system may aggregate at least two CCRs, from the plurality of CCRs, respectively corresponding to the at least two groups of testcases into a CCR group, where the at least two CCRs in the CCR group are to be processed in in one workflow by the CI pipeline. Here, one of the at least two CCRs corresponds to one of the at least two groups of testcases and another of the at least two CCRs corresponds to another of the at least two groups of testcases. Then the process 1000 is ended.

In some embodiments, the selecting is based on the plurality of CCRs and the functions of the software product tested by each testcase in the testcase set.

In some embodiments, a CCR of the plurality of CCRs comprises information of original code and changed code, such as locations of the original code and the changed code in a code base repository, and a request for verifying the changed code by the CI pipeline.

In some embodiments, the CCR aggregation system 410 (FIG. 4) may obtain functions tested by each testcase by obtaining functions footprint for each testcase in the testcase set via a tracing and logging system and analyzing the functions footprint for each testcase to obtain functions tested by each testcase.

In some embodiments, if the at least two CCRs are aggregated into the CCR group, the CI pipeline may obtain each changed code related to each CCR in the CCR group, such as from the repository based on information of each CCR, then replace every original code with every changed code related to each CCR in the CCR group into the software product to obtain a merged software product, and then build the merged software product to obtain a built software product, and at last test the built software product using the at least two groups of testcases.

Figure 11:
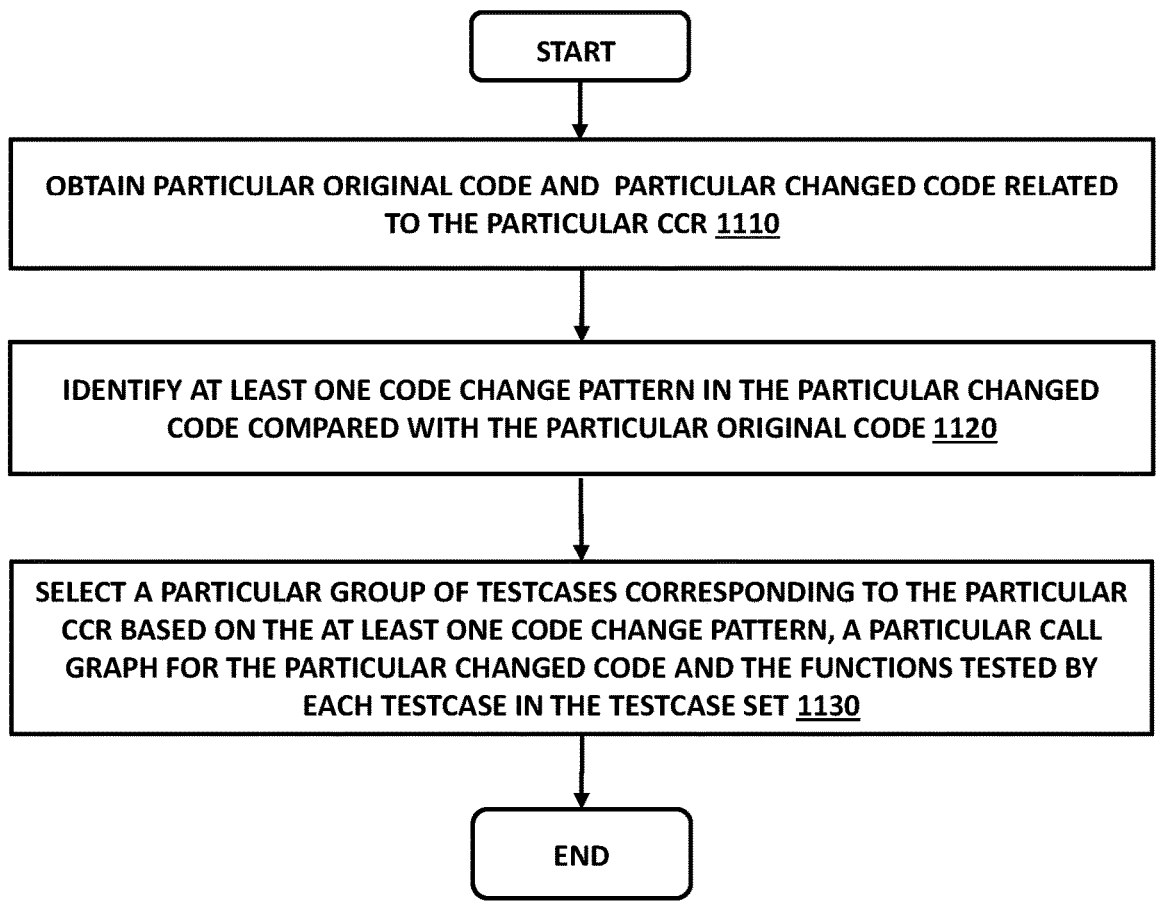
FIG. 11 depicts a flowchart of an exemplary method for selecting a specific group of testcases corresponding to a specific CCR, according to some embodiments.

In some embodiments, FIG. 11 depicts a proposed flowchart of an exemplary method 1100 for selecting a particular group of testcases corresponding to a particular CCR from a testcase set according to some embodiments of the present disclosure. The method 1100 may be implemented by the testcase selector 413 (FIG. 4), or other suitable computer/computing systems. For ease of understanding, the method 1100 will be described with reference to FIG. 4.

After the process 1100 starts, at 1110, for a particular CCR in the plurality of CCRs, the testcase selector 413 may obtain particular original code and particular changed code related to the particular CCR, such as from the repository based on locations of specific original code and the specific changed code included in information of the particular CCR.

At 1120, the testcase selector 413 may identify at least one code change pattern in the particular changed code compared with the particular original code.

At 1130, the testcase selector 413 may select a particular group of testcases corresponding to the particular CCR based on the at least one code change pattern, a particular call graph for the particular changed code and the functions tested by each testcase in the testcase set, where the particular call graph comprises code paths, each code path consisting of directly connected edges through nodes and connected nodes, each node representing a function in the particular changed code, and each edge between two nodes representing a call relationship between two functions represented by the two nodes. Then the process 1100 is ended.

In some embodiments, for each specific code change pattern in the at least one code change pattern, if the testcase selector 413 (FIG. 4) determines that the code change pattern is related to an updated function, then for each specific testcase in the testcase set, the testcase selector 413 may add a specific testcase to the particular group of testcases corresponding to the particular CCR if the specific testcase tests a function included in either code paths affecting the updated function or code paths affecting a parent function of the updated function in the specific call graph.

In some embodiments, for each specific code change pattern in the at least one code change pattern, if the testcase selector 413 (FIG. 4) determines that the code change pattern is related to an added function, then for each specific testcase in the testcase set, the testcase selector 413 may add the specific testcase to the particular group of testcases corresponding to the particular CCR if the specific testcase tests a function included in either code paths affecting the added function or code paths affecting a parent function of the added function in the specific call graph.

In some embodiments, for each specific code change pattern in the at least one code change pattern, if the testcase selector 413 (FIG. 4) determines that the code change pattern is related to a deleted function, then for each specific testcase in the testcase set, the testcase selector 413 may add the specific testcase to the particular group of testcases corresponding to the particular CCR if the specific testcase tests a function included in code paths affecting a parent function of the deleted function in the specific call graph.

It should be noted that the methods 1000 (FIG. 10) and 1100 (FIG. 11), according to embodiments of the present disclosure, could be implemented by computer system/server 102 of FIG. 1. It also should be noted that the methods 1000 and 1100, according to embodiments of the present disclosure, could be implemented in any computer system. In some embodiments, the methods 1000 and 1100 can be implemented in a cloud computing environment (such as cloud computing environment 50 from FIG. 2), and respective steps in the methods 1000 and 1100 can be implemented in respective containers/POD in the cloud computing environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, by one or more processing units, a plurality of code change requests (CCRs) for a software product that are to be processed by a continuous integration (CI) pipeline;
    obtaining, by one or more processing units, all functions of the software product tested by all testcases in a testcase set;
    selecting, by one or more processing units, a plurality of groups of testcases from the testcase set, each group of the plurality of groups of testcases corresponding to a CCR from the plurality of CCRs;
    identifying, by one or more processing units, at least two groups of testcases from the plurality of groups of testcases without overlapping code, wherein each group of testcases, from the at least two groups of testcases, has all different functions than the other groups of testcases from the at least two groups of testcases;
    in response to identifying the at least two groups of testcases, aggregating, by one or more processing units, each CCR that corresponds to the at least two groups of testcases into a single CCR group; and
    testing a built software product using the at least two groups of testcases.

2. The method of claim 1, wherein the selecting the plurality of groups of testcases is based on the plurality of CCRs and functions of the software product tested by each testcase in the testcase set.

3. The method of claim 2, wherein a first CCR of the plurality of CCRs comprises information of original code and changed code, and wherein the selecting comprises:
    obtaining first original code and first changed code related to the first CCR;
    identifying at least one code change pattern in the first changed code compared with the first original code; and
    selecting a first group of testcases corresponding to the first CCR based on the at least one code change pattern, a first call graph for the first changed code, and functions tested by each testcase in the testcase set.

4. The method of claim 3, wherein the first call graph comprises code paths, each code path comprising directly connected edges through nodes and connected nodes, each node representing a function of a particular changed code, and each edge between two nodes representing a call relationship between two functions represented by the two nodes.

5. The method of claim 3, wherein the selecting the first group of testcases corresponding to the first CCR comprises:
    determining that a specific code change pattern in the at least one code change pattern is related to an updated function;
    determining that a specific testcase in the testcase set is testing a function included in at least one of code paths affecting the updated function and code paths affecting a parent function of the updated function in the first call graph; and
    adding the specific testcase in the testcase set to the first group of testcases corresponding to the first CCR.

6. The method of claim 3, wherein the selecting the first group of testcases corresponding to the first CCR comprises:
    determining that a specific code change pattern in the at least one code change pattern is related to an added function;
    determining that a specific testcase in the testcase set is testing a function included in at least one of code paths affecting the added function and code paths affecting a parent function of the added function in the first call graph; and
    adding the specific testcase in the testcase set to the first group of testcases corresponding to a particular CCR.

7. The method of claim 3, wherein the selecting the first group of testcases corresponding to the first CCR comprises:
    determining that a specific code change pattern in the at least one code change pattern is related to a deleted function;
    determining that a specific testcase in the testcase set is testing a function included in code paths affecting a parent function of the deleted function in the first call graph; and
    adding the specific testcase to the first group of testcases corresponding to a particular CCR.

8. The method of claim 1, wherein obtaining all functions of the software product tested by all testcases in the testcase set comprises:
    obtaining a function footprint for each testcase in the testcase set via a tracing and logging system; and
    analyzing the function footprint for each testcase in the testcase set to obtain functions tested by each testcase.

9. The method of claim 1, further comprising:
    in response to aggregating each CCR into the CCR group, obtaining changed code related to each CCR in the CCR group;
    replacing each original code with each changed code related to each CCR in the CCR group into the software product to obtain a merged software product; and
    building the merged software product to obtain the built software product.

10. A system, comprising:
    at least one processing unit; and
    a memory coupled to the at least one processing unit and storing instructions thereon, the instructions, when executed by the at least one processing unit, performing actions including:
    receiving, by one or more processing units, a plurality of code change requests (CCRs) for a software product that are to be processed by a continuous integration (CI) pipeline;
    obtaining, by one or more processing units, all functions of the software product tested by all testcases in a testcase set;
    selecting, by one or more processing units, a plurality of groups of testcases from the testcase set, each group of the plurality of groups of testcases corresponding to a CCR from the plurality of CCRs;

identifying, by one or more processing units, at least two groups of testcases from the plurality of groups of testcases without overlapping code, wherein each group of testcases, from the at least two groups of testcases, has all different functions than the other groups of testcases from the at least two groups of testcases;

in response to identifying the at least two groups of testcases, aggregating, by one or more processing units, each CCR that corresponds to the at least two groups of testcases into a single CCR group; and testing a built software product using the at least two groups of testcases.

11. The system of claim 10, wherein the selecting the plurality of groups of testcases is based on the plurality of CCRs and functions of the software product tested by each testcase in the testcase set.

12. The system of claim 11, wherein a first CCR of the plurality of CCRs comprises information of original code and changed code, and wherein the selecting comprises:

obtaining first original code and first changed code related to the first CCR;

identifying at least one code change pattern in the first changed code compared with the first original code; and selecting a first group of testcases corresponding to the first CCR based on the at least one code change pattern, a first call graph for the first changed code, and functions tested by each testcase in the testcase set.

13. The system of claim 12, wherein the selecting the first group of testcases corresponding to the first CCR comprises:

determining that a specific code change pattern in the at least one code change pattern is related to an updated function;

determining that a specific testcase in the testcase set is testing a function included in at least one of code paths affecting the updated function and code paths affecting a parent function of the updated function in the first call graph; and adding the specific testcase in the testcase set to the first group of testcases corresponding to the first CCR.

14. The system of claim 12, wherein the selecting the first group of testcases corresponding to the first CCR comprises:

determining that a specific code change pattern in the at least one code change pattern is related to an added function;

determining that a specific testcase in the testcase set is testing a function included in at least one of code paths affecting the added function and code paths affecting a parent function of the added function in the first call graph; and adding the specific testcase in the testcase set to the first group of testcases corresponding to a particular CCR.

15. The system of claim 12, wherein the selecting the first group of testcases corresponding to the first CCR comprises:

determining that a specific code change pattern in the at least one code change pattern is related to a deleted function;

determining that a specific testcase in the testcase set is testing a function included in code paths affecting a parent function of the deleted function in the first call graph; and adding the specific testcase to the first group of testcases corresponding to a particular CCR.

16. A computer program product, comprising a computer-readable storage medium having program instructions embodied therewith, the program instructions executable by a first component with at least one processing unit in a cloud computing environment to cause the at least one processing unit to perform actions including:

receiving, by one or more processing units, a plurality of code change requests (CCRs) for a software product that are to be processed by a continuous integration (CI) pipeline;

obtaining, by one or more processing units, all functions of the software product tested by all testcases in a testcase set;

selecting, by one or more processing units, a plurality of groups of testcases from the testcase set, each group of the plurality of groups of testcases corresponding to a CCR from the plurality of CCRs;

identifying, by one or more processing units, at least two groups of testcases from the plurality of groups of testcases without overlapping code, wherein each group of testcases, from the at least two groups of testcases, has all different functions than the other groups of testcases from the at least two groups of testcases;

in response to identifying the at least two groups of testcases, aggregating, by one or more processing units, each CCR that corresponds to the at least two groups of testcases into a single CCR group; and testing a built software product using the at least two groups of testcases.

17. The computer program product of claim 16, wherein the selecting the plurality of groups of testcases is based on the plurality of CCRs and functions of the software product tested by each testcase in the testcase set.

18. The computer program product of claim 17, wherein a first CCR of the plurality of CCRs comprises information of original code and changed code, and wherein the selecting comprises:

obtaining first original code and first changed code related to the first CCR;

identifying at least one code change pattern in the first changed code compared with the first original code; and selecting a first group of testcases corresponding to the first CCR based on the at least one code change pattern, a first call graph for the first changed code, and functions tested by each testcase in the testcase set.

19. The computer program product of claim 16, wherein obtaining all functions of the software product tested by all testcases in the testcase set comprises:

obtaining a function footprint for each testcase in the testcase set via a tracing and logging system; and analyzing the function footprint for each testcase in the testcase set to obtain functions tested by each testcase.

20. The computer program product of claim 16, further comprising:

in response to aggregating each CCR into the CCR group, obtaining changed code related to each CCR in the CCR group;

replacing each original code with each changed code related to each CCR in the CCR group into the software product to obtain a merged software product; and building the merged software product to obtain the built software product.

* * * * *